United States Patent
Grostete et al.

(10) Patent No.: US 10,880,343 B2
(45) Date of Patent: Dec. 29, 2020

(54) CONFERENCING SYSTEM EXPLOITING TERMINAL DIVERSITY

(71) Applicant: ALE INTERNATIONAL, Colombes (FR)

(72) Inventors: Yann Grostete, Brest (FR); Ronan Thepaut, Plabennec (FR); Jerome Elleouet, Lannilis (FR)

(73) Assignee: ALE INTERNATIONAL, Colombes (FR)

(*) Notice: Subject to any disclaimer, the term of this patent is extended or adjusted under 35 U.S.C. 154(b) by 0 days.

(21) Appl. No.: 16/479,500

(22) PCT Filed: Jan. 23, 2018

(86) PCT No.: PCT/IB2018/050409
§ 371 (c)(1),
(2) Date: Jul. 19, 2019

(87) PCT Pub. No.: WO2018/134802
PCT Pub. Date: Jul. 26, 2018

(65) Prior Publication Data
US 2019/0334958 A1    Oct. 31, 2019

(30) Foreign Application Priority Data
Jan. 23, 2017  (EP) ..................... 17305071

(51) Int. Cl.
*H04L 29/06*    (2006.01)

(52) U.S. Cl.
CPC ........ *H04L 65/403* (2013.01); *H04L 65/1069* (2013.01); *H04L 65/1093* (2013.01); *H04L 65/80* (2013.01)

(58) Field of Classification Search
CPC .... H04W 24/06; H04M 3/2236; H04M 7/006
See application file for complete search history.

(56) References Cited

U.S. PATENT DOCUMENTS

2010/0027431 A1* 2/2010 Morrison ............ H04L 41/0681
                                                                 370/252
2010/0135171 A1   6/2010 Jung et al.
(Continued)

FOREIGN PATENT DOCUMENTS

EP            2493143 A1    8/2012

OTHER PUBLICATIONS

International Search Report with regard to PCT/IB2018/050409 dated Jun. 6, 2018.
(Continued)

*Primary Examiner* — Charles C Jiang
*Assistant Examiner* — Saad Khawar
(74) *Attorney, Agent, or Firm* — BCF LLP

(57) ABSTRACT

The technology relates to a method for testing the quality of a VoIP communication link between a multipoint control unit and a terminal, the method being performed at the multipoint control unit providing the capability for terminals to participate in a VoIP session, the method comprising: —sending an audio sample to the terminal, —receiving a reception report from the terminal, the reception report containing reception statistics for the audio sample, —computing a Mean opinion score—i.e. MOS—based on the reception report.

11 Claims, 13 Drawing Sheets

(56) References Cited

U.S. PATENT DOCUMENTS

| | | | |
|---|---|---|---|
| 2012/0042032 A1* | 2/2012 | Fredette | H04L 7/0012 |
| | | | 709/214 |
| 2015/0163811 A1* | 6/2015 | Konstantinou | H04W 76/16 |
| | | | 370/329 |
| 2017/0118666 A1* | 4/2017 | Patel | H04L 67/2842 |
| 2017/0272578 A1* | 9/2017 | Shiota | H04W 4/06 |
| 2017/0344338 A1* | 11/2017 | Hu | G06F 3/167 |

OTHER PUBLICATIONS

Aguiar et al., "QoS of multiparty videoconference over geostationary satellites", IEE Conference Publica, Institution of Electrical Engineers, No. 2004-10492, 2004, London, pp. 70-73.

* cited by examiner

CONFERENCING SYSTEM EXPLOITING TERMINAL DIVERSITY

PRIORITY

The present application claims priority to European Patent Application No. 17305071.7, filed Jan. 23, 2017, entitled "CONFERENCING SYSTEM EXPLOITING TERMINAL DIVERSITY", which is incorporated by reference herein in its entirety.

FIELD OF THE TECHNOLOGY

The technology relates to the technical field of conferencing systems.

BACKGROUND

End users participating in a conferencing session using Voice over Internet Protocol (VoIP) technologies sometimes have access to more than one terminal able to access a VoIP session. End user may for example have access to a desk phone, a softphone on a personal computer, a mobile phone or a tablet, a home phone, or a mobile phone.

All the terminals available to an end user do not access VoIP session though the same communication channel. Terminals supporting VoIP connect to the VoIP session through the internet while traditional desk phones and mobile phones connect to the VoIP session over the traditional public switched telephone network (PSTN) though a PSTN gateway of the conferencing system.

The perceived quality of voice transmission offered by the different available terminals may vary independently. For example, a terminal accessing the VoIP session through the internet would not be affected by a disturbance of the PSTN network while a traditional desk phone or mobile phone accessing the VoIP session through the PSTN network would not be affected by a poor Wi-Fi connection.

Exploiting terminal diversity to improve the perceived quality of voice communication in a VoIP session however raises the challenge of identifying the terminal offering the best perceived quality of voice transmission for the end user.

The perceived quality of voice transmission depends on many factors, and not merely on network performance such as packet delay or loss. The relation between network performance and perceived quality of voice transmission is determined partly by application specific parameters such as codec algorithms, playout buffer size, error concealment mechanisms. Therefore, selecting the terminal with the best network performance does not guarantee an improved perceived quality of transmission for the end user.

SUMMARY

The technology enables to dynamically select from among several terminals based on their respective perceived quality from the users' perspective. The technology thereby offers meaningful improvements in perceived quality of transmission for the end user. The technology is compatible with many types of terminals, and in particular with VoIP phones, Wi-Fi enabled mobile phones having pre-installed SIP client software, or mobile phones capable of running IP telephony clients, terminals supporting webRTC and traditional desk and mobile phones.

In an embodiment, the technology provides a method for testing the quality of a VoIP communication link between a multipoint control unit and a terminal, the method being performed at the multipoint control unit providing the capability for terminals to participate in a VoIP session, the method comprising:
  sending an audio sample to the terminal,
  receiving a reception report from the terminal, the reception report containing reception statistics for the audio sample,
  computing a Mean opinion score—i.e. MOS—based on the reception report.

In an embodiment, the technology provides a method for controlling a VoIP session established between a first terminal and a second terminal, the first terminal belonging to a group of terminals, the group of terminals further comprising at least one candidate terminal and a user interface, the method comprising, for each of the first terminal and the at least one candidate terminal:
  sending an audio sample to the terminal,
  receiving a reception report from the terminal, the reception report containing reception statistics for the audio sample,
  computing a Mean opinion score—i.e. MOS—for each reception report,
the method further comprising steps of:
  selecting the candidate terminal for which the reception report has the highest MOS,
  computing a switching relevance score based on the MOS of the first terminal and on the MOS of the selected candidate terminal,
  if the switching relevance score is higher than a switching relevance threshold, displaying on the user interface a request for an authorization to switch the VoIP session to the selected candidate terminal,
  in response to an authorization to switch the VoIP session to the selected candidate terminal, sending a request to the selected candidate terminal to join the VoIP session,
  upon receiving an acknowledgement from the selected candidate terminal confirming that the selected candidate terminal has successfully joined the VoIP session, excluding the first terminal from the VoIP session.

In embodiments, the switching relevance score is the difference between the MOS of the selected candidate terminal and the MOS of the first terminal.

In embodiments, the step of sending an audio sample to a terminal, comprises, for some candidate codecs of the terminal, the step of sending an audio sample to the terminal encoded with the candidates codec,
and wherein the step of receiving a reception report from a terminal comprises, for each candidate codec of the terminal, the step of receiving a reception report from the terminal for the audio sample encoded with the candidate codec,
and wherein the step of computing a MOS based on the reception report sent by a terminal, comprises, for each candidate codec of the terminal, the step of computing a MOS based on the reception report for the audio sample encoded with the candidate codec,
and wherein the step of selecting the candidate terminal, comprises the step of selecting the candidate codec and the candidate terminal having the highest MOS among all the candidate codecs and all the candidate terminals,
and wherein the switching relevance score computed at step is based on the MOS of the first terminal and on the MOS of the selected candidate terminal and of the selected candidate codec.

In embodiments, the switching relevance score is the difference between the MOS of the selected candidate codec and of the selected candidate terminal and the MOS of the first terminal.

In embodiments, the reception report includes transmitted octet and packet counts, packet loss, packet delay variation, and round-trip delay time.

In embodiments, the switching relevance threshold is a preset threshold.

In embodiments, the method further comprises steps of:
storing in an end user decision history database, the identifier and the MOS of the first terminal, the identifier and the MOS of the selected candidate terminal, and the decision of the end user,
the switching relevance threshold being computed furthermore based on the previous decisions of the end user associated to the first terminal and to the selected candidate terminal.

In embodiments, the switching relevance threshold is computed furthermore based on the location of the first terminal.

In embodiments, the method further comprises, if the MOS of all the candidate terminals are below a problem detection threshold, sending an alarm message to a system console.

The technology also provides a method for controlling a VoIP session established between a first terminal and a second terminal, the first terminal belonging to a group of terminals, the group of terminals further comprising at least one candidate terminal and a user interface, said method comprising analyzing the voice transmission between the first terminal and the second terminal to detect a word or expression stored in a database storing a list of words or expressions considered as indicative of a poor perceived quality of transmission, and upon detection of a word or expression stored in the database, performing the method as described above.

The technology also provides a method for controlling a VoIP session established between a first terminal and a second terminal, the first terminal belonging to a first group of terminals, the first group of terminals further comprising at least one candidate terminal and a user interface, said method comprising analyzing instant messages exchanged during the VoIP session to detect a word or expression stored in a database storing a list of words or expressions considered as indicative of a poor perceived quality of transmission, and upon detection of a message corresponding to a word or expression stored in the database, performing the method as described above.

The technology also provides a conferencing system configured to control a VoIP session established between a first terminal and a second terminal, the first terminal belonging to a group of terminals, the group of terminals further comprising at least one candidate terminal and a user interface, the conferencing system being configured to, for each of the first terminal and the at least one candidate terminal:
send an audio sample to the terminal,
receive a reception report from the terminal, the reception report containing reception statistics for the audio sample,
compute a MOS for each reception report,
the conferencing system being further configured to:
select the candidate terminal for which the reception report has the highest MOS,
compute a switching relevance score based on the MOS of the first terminal and on the MOS of the selected candidate terminal,
if the switching relevance score is higher than a switching relevance threshold, display on the user interface a request for an authorization to switch the VoIP session to the selected candidate terminal,
in response to an authorization to switch the VoIP session to the selected candidate terminal, send a request to the selected candidate terminal to join the VoIP session, upon receiving an acknowledgement from the selected candidate terminal confirming that the selected candidate terminal has successfully joined the VoIP session, exclude the first terminal from the VoIP session.

The technology also provides a method for selecting a terminal among a group of candidate terminals configured to connect to a VoIP session, the group of terminals comprising at least two candidate terminals and a user interface, the method comprising,
testing the quality of the VoIP communication link between the multipoint control unit and each of the candidate terminals:
the method further comprising steps of:
selecting the candidate terminal for which the reception report has the highest MOS,
displaying on the user interface the identity of the selected candidate terminal.

The technology also provides a method for monitoring a VoIP communication network, the VoIP communication network comprising terminals and a multipoint control unit providing the capability for the terminals to participate in a VoIP session, the method comprising
for some of the terminals of the network, testing the quality of the VoIP communication link between the multipoint control unit and the terminal,
the method further comprising
detecting a network failure based on the computed MOS(s), and sending an alarm message to a system console (38).

BRIEF DESCRIPTION OF THE DRAWINGS

These and other aspects of the technology will be apparent from and elucidated with reference to the embodiments described hereinafter, by way of example, with reference to the drawings.

DETAILED DESCRIPTION OF THE EMBODIMENTS

Figure 1:
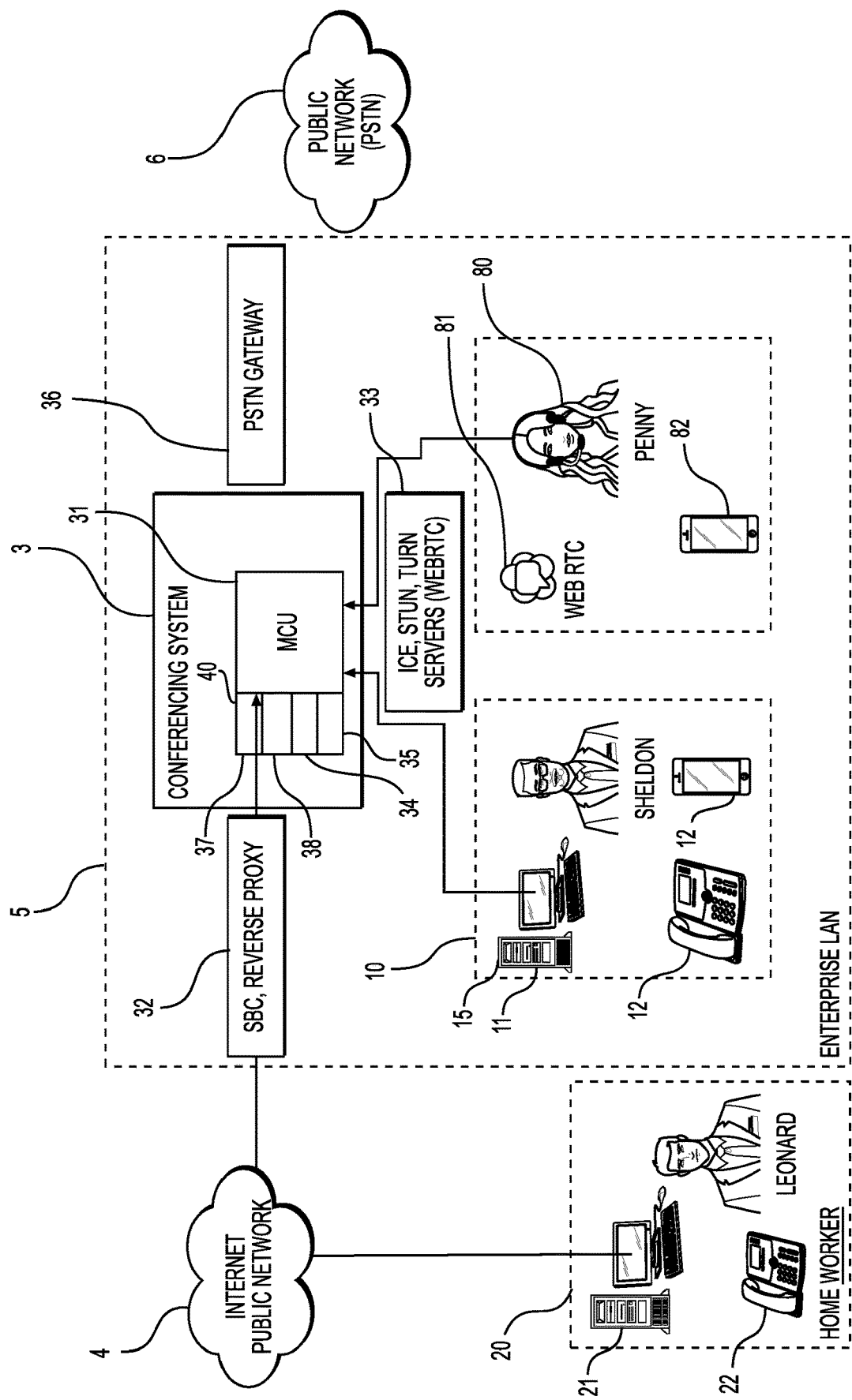
FIG. 1 illustrates a VoIP session at an initial state.

As illustrated by FIG. 1, a conferencing system 3 comprises a multipoint control unit 31 (MCU). The MCU 31 provides the capability for terminals 11, 12, 21, 22, 81, 82 to participate in a multipoint conference.

Terminals 11, 12, 21, 22, 81, 82 may be VoIP phones using Voice over IP technologies. In particular, terminals may be SIP phones implementing client and server functions of a SIP user agent and provides the traditional call functions of a telephone, such as dial, answer, reject, call hold, and call transfer. A SIP phone may be implemented as a hardware device or as a softphone. Terminals may be Wi-Fi enabled mobile phones having pre-installed SIP client software, or mobile phones capable of running IP telephony clients. VoIP phones may be connected to the MCU 31 over the internet. Other VoIP phones may be connected to the MCU 31 over a local area network (LAN) supporting the internet protocol. A session border controller (SBC) 32 may serve as a middle box between a terminal and the MCU 31.

Terminals may be SIP webRTC terminals supporting WebRTC (Web Real-Time Communication). WebRTC is a collection of communications protocols and application programming interfaces that enable real-time communication over peer-to-peer connections. This enables conferencing without the need of either internal or external plugins. SIP webRTC terminals may be connected to the MCU 31 through an Interactive Connectivity Establishment (ICE) server. ICE provides a framework with which a communicating peer may discover and communicate its public IP address so that it can be reached by other peers. Additionally SIP webRTC terminals may be connected to the MCU 31 through a Session Traversal Utilities for NAT (STUN) server (STUN is a standardized protocol for address discovery including NAT classification) or through a Traversal Using Relays around NAT (TURN) server (The TURN server relays messages between the terminal and the MCU when direct media traffic between them is not allowed by a firewall).

Terminals may also be connected to the MCU 31 over the traditional public switched telephone network (PSTN) 6 though a PSTN gateway 36 providing an interface to the PSTN network and IP connectivity to the MCU 31. Such terminals may be traditional phones placing and transmitting telephone calls over the PSTN network 6 or mobile phones making and receiving calls over a radio frequency link establishing a connection to the switching systems of a mobile phone operator, which provides access to the PSTN network 6.

The MCU 31 supports an application layer protocol for controlling a VoIP session, like the Session Initiation Protocol (SIP). The Real-time Transport Protocol (RTP) or Secure Real-time Transport Protocol (SRTP) is employed for the transmission of media streams. SIP may be paired with other protocols for discovering network topology such as Traversal Using Relays around NAT (TURN), or Simple Traversal of UDP through NATs (STUN).

The conferencing system 3 comprises an intelligent agent 35. In particular, the intelligent agent may exhibit some aspect of artificial intelligence, such as learning and reasoning abilities. The intelligent agent 35 comprises a chat bot configured to communicate with an end user through an end user interface 15.

The conferencing system 3 may comprise a system console 38 for system administration.

Terminals 11, 12, 21, 22, 81, 82 are grouped in groups 10, 20, 80 of terminals. A group 10, 20, 80 of terminals is typically associated to an end user or to a location. A group of terminals comprises at least one end user interface 15.

A connected terminal 11, 21, 81 is a terminal currently participating in a VoIP session. A candidate terminal 12, 22, 82 is a terminal not currently participating in a VoIP session but that has the ability to connect to the VoIP session.

In the example illustrated by FIG. 1, a VoIP is established between a first terminal 11, a second terminal 21 and a third terminal 81. The first terminal 11, belongs to a first group 10 associated to end user Sheldon, and is a softphone 11 connected to the MCU 31 over a LAN 5. The first group 10 also comprises a SIP phone 12 and a mobile phone 12. The second terminal 21, belongs to a second group 20 associated to end user Leonard, and is a softphone. The second group 20 also comprises a PSTN phone 22. The third terminal 21, belongs to a third group 80 associated to end user Penny, and is a webRTC terminal 81 connected to the MCU 31 through a TURN server 33. The third group 80 also comprises a mobile phone 82.

The MCU 31 may comprise a terminal database 40 registering for each group 10, 20, 80 the terminals associated to said group. The terminal database 40 may register the connection status of terminals, for example in the case of applications running on PC, mobile, or tablets. When a new terminal is registered in the terminal database 40 of the MCU 31, specific steps may be performed by the MCU 31 as will be described in detail in relation to FIG. 5.

The MCU 31 may test the VoIP communication link from the MCU 31 to any terminal 11, 12, 21, 22, 81, 82 of the IP network, connected terminals as well as candidate terminals. The method for testing a link to a terminal is now described in relation to FIG. 2.

The MCU 31 sends an audio sample to the terminal at a step S1. The audio sample comprises a sufficient number of RTP packets, typically between 100 and 1000 RTP packets.

Upon receiving an audio sample, the terminal sends back a reception report. A reception report includes transmission statistics (such as transmitted octet and packet counts, packet loss, packet delay variation, and round-trip delay time) on quality aspects of the reception of the audio sample. The reception report is typically a RTCP report. Basic functionality and packet structure of the RTCP protocol is defined in RFC 3550. At a step S2, the MCU 31 receives a reception report from the terminal.

The MCU 31 computes a Mean opinion score—i.e. MOS—from the reception report at a step S3.

The Mean opinion score (MOS) is a test providing a numerical indication of the perceived quality of the transmission from the users' perspective.

MOS can be computed using the PESQ method described in ITU P862 normalization.

MOS can be computed from an objective measure of quality like the R-factor described in ITU G107 normalization.

Figure 2:
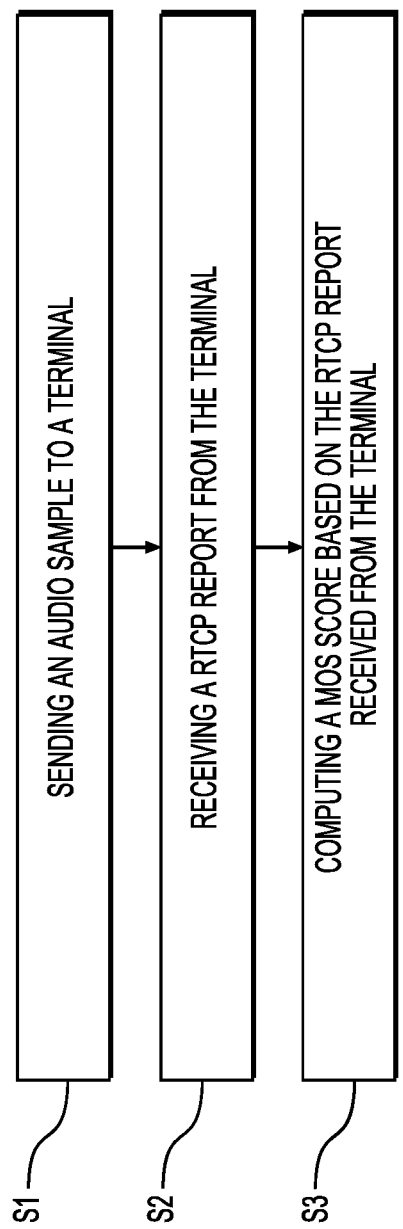
FIG. 2 is a flowchart of a method for testing a VoIP communication link from a MCU to a terminal according to an embodiment of the technology.
Figure 4:
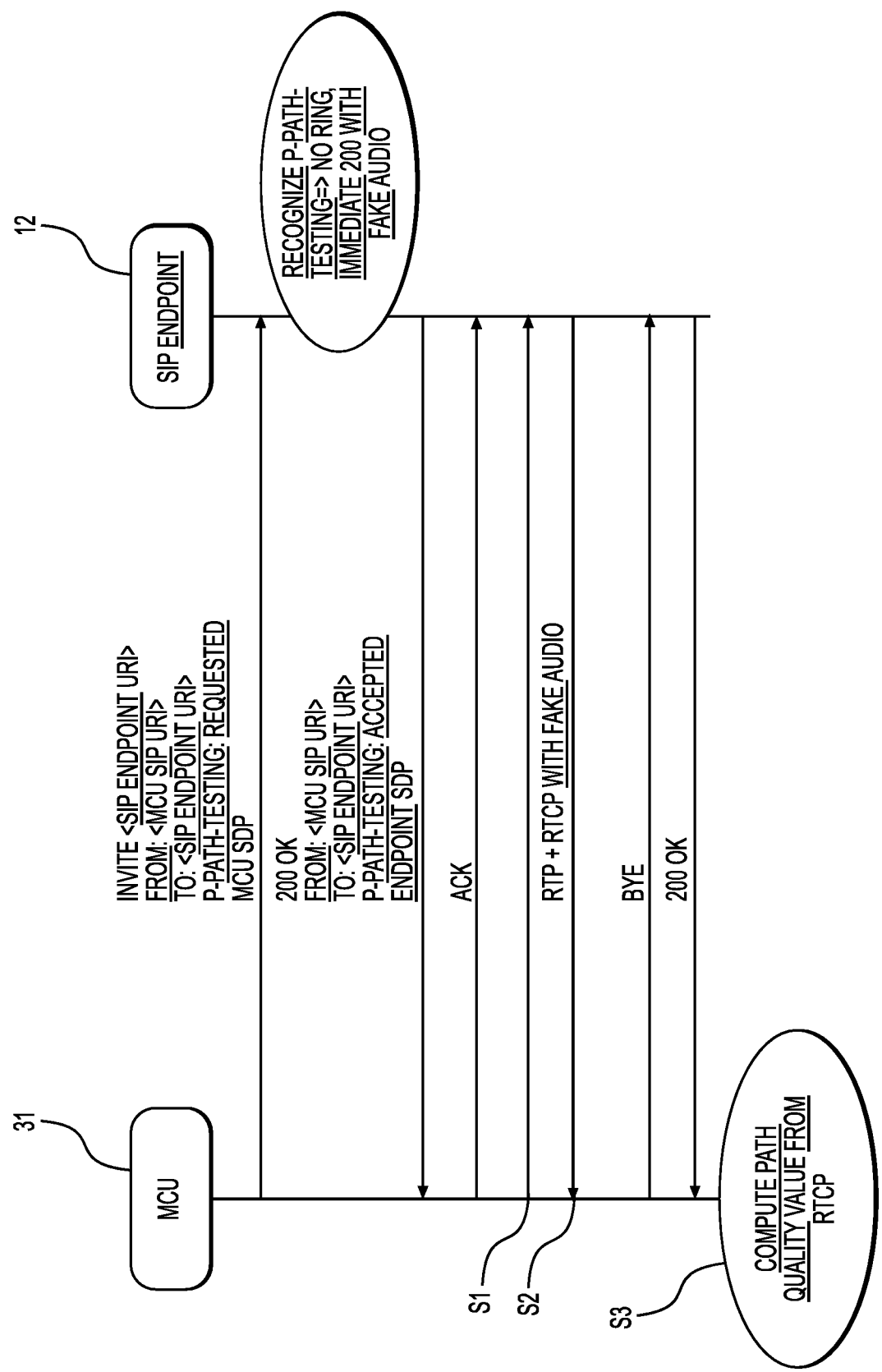
FIG. 4 is a call flow illustrating the method of FIG. 2 according to an embodiment of the technology.

FIG. 4 illustrates steps S1, S2 and S3 of FIG. 2 in detail. In FIG. 4, steps S1, S2 and S3 are performed for a candidate terminal 12 of the first group. Steps S1, S3 and S3 may be performed in a similar way for any other terminal of the network and in particular for the first terminal 11.

The MCU 31 first sends an INVITE request to the terminal 12 in order to establish a dialog with the terminal 12. The INVITE request comprises the identifier (p-path-testing) of the HTTP method corresponding to steps S1 to S3.

The INVITE request sent to the terminal 12 includes an instruction to activate a silent background mode in order to avoid that the terminal 12 rings. Upon receiving the INVITE request, the terminal 12 activates a silent or background mode for a predefined period of time.

In response to the INVITE request, the terminal 12 sends a response (200 OK) to the MCU 31 indicating that the dialogue was successfully established. The MCU 31 sends an acknowledgement message to the terminal 12.

A VoIP session is established between the MCU 31 and the terminal 12. Media streams are transferred between the MCU 31 and the terminal 12 employing the Real Time Transport Protocol (RTP)

The MCU 31 sends an audio sample to the terminal 12.

The terminal 12 sends a RTCP report containing reception statistics for the RTP packets sent by the MCU 31 corresponding to the audio sample.

The MCU 31 sends a BYE message to shut down the stream. The terminal 12 sends a 200 OK response to the MCU 31 indicating that the stream was shut down.

Figure 6:
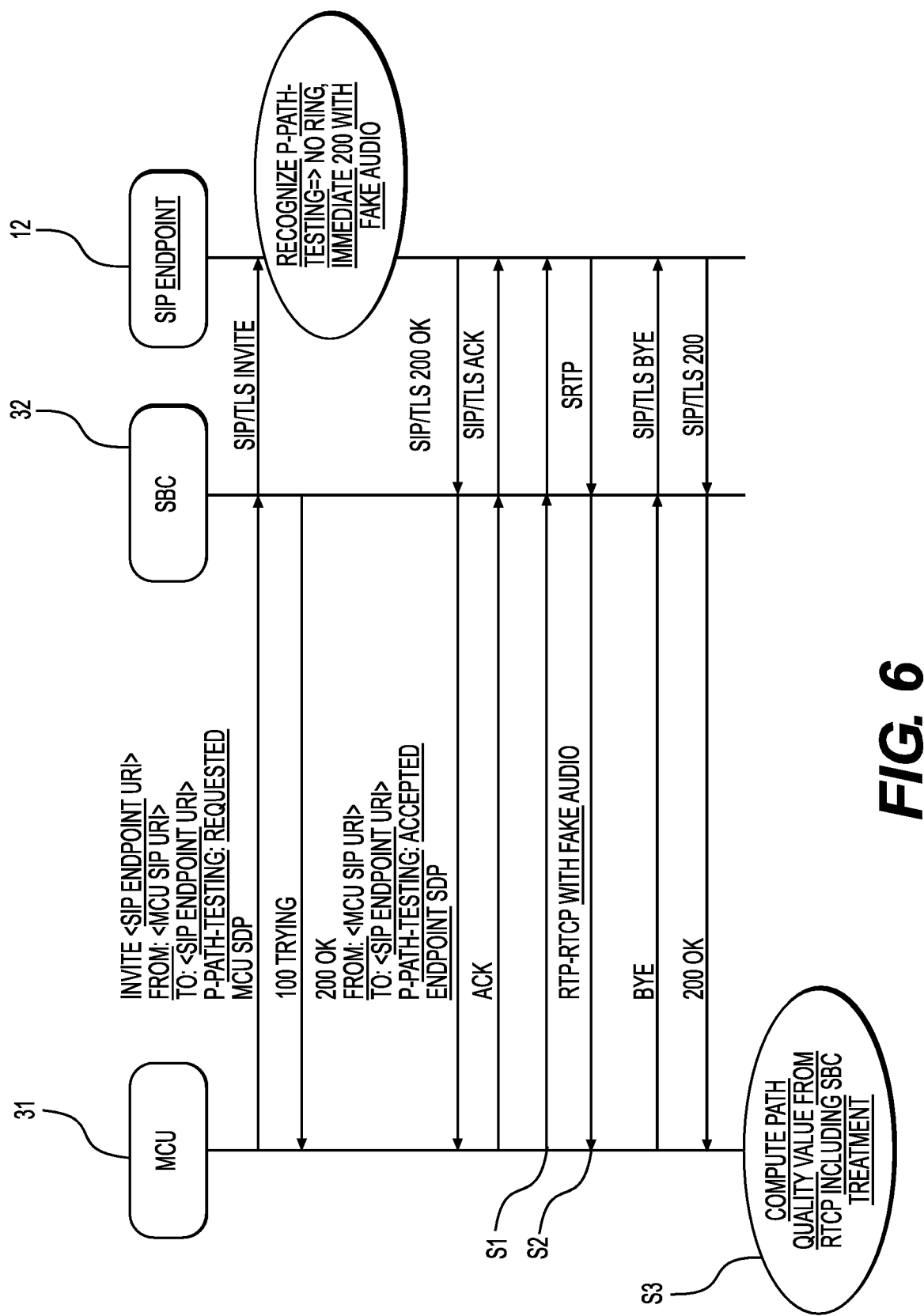
FIG. 6 is a call flow illustrating the method of FIG. 2 for a terminal connected to the MCU through a SBC.

Steps S1, S2 and S3 of FIG. 2 are now described in detail in relation to FIG. 6, in the case when a terminal communicates with the MCU 31 through a SBC 32. In FIG. 6, steps S1, S2 and S3 are performed for a candidate terminal 12 of the first group. Steps S1, S3 and S3 may be performed in a similar way for any other terminal of the network and in particular for the first terminal 11. The MCU 31 sends the INVITE request to the SBC 32 in order to establish a dialog with the SBC 32.

In response to the INVITE request, the SBC 32 sends an INVITE request to the terminal 12 to establish a dialog with the terminal 12 and a provisional response to the MCU 31 indicating that the request to establish a dialogue with the SBC 32 is being processed.

The terminal 12 sends a 200 OK response to the SBC 32 indicating that the dialogue was successfully established. In response to the 200 OK response, the SBC 32 sends a 200 OK response to the MCU indicating that the dialogue was successfully established with the terminal 12. The MCU 31 sends an acknowledgement message to the SBC 32 and the SBC 32 forwards the acknowledgement message to the terminal 12.

A VoIP session is established between the MCU 31 and the terminal 12 through the SBC 32. Media streams are transferred between the MCU 31 and the SBC 32 employing the RTP protocol and between the SBC 32 and the terminal 12 employing the SRTP protocol.

The MCU 31 sends an audio sample to the SBC 32 and the SBC 32 transfers the audio sample to the terminal 12.

The terminal 12 sends the RTCP report to the SBC 32 and the SBC 32 transfers the RTCP report to the MCU 31.

The MCU 31 sends a BYE message to the SBC 32 to shut down the stream. The SBC sends a BYE message to the terminal 12 to shut down the stream. The terminal 12 sends a 200 OK response to the SBC 32 indicating that the stream was shut down. The SBC 32 sends a 200 OK response to the MCU 31 indicating that the stream was shut down.

Figure 7:
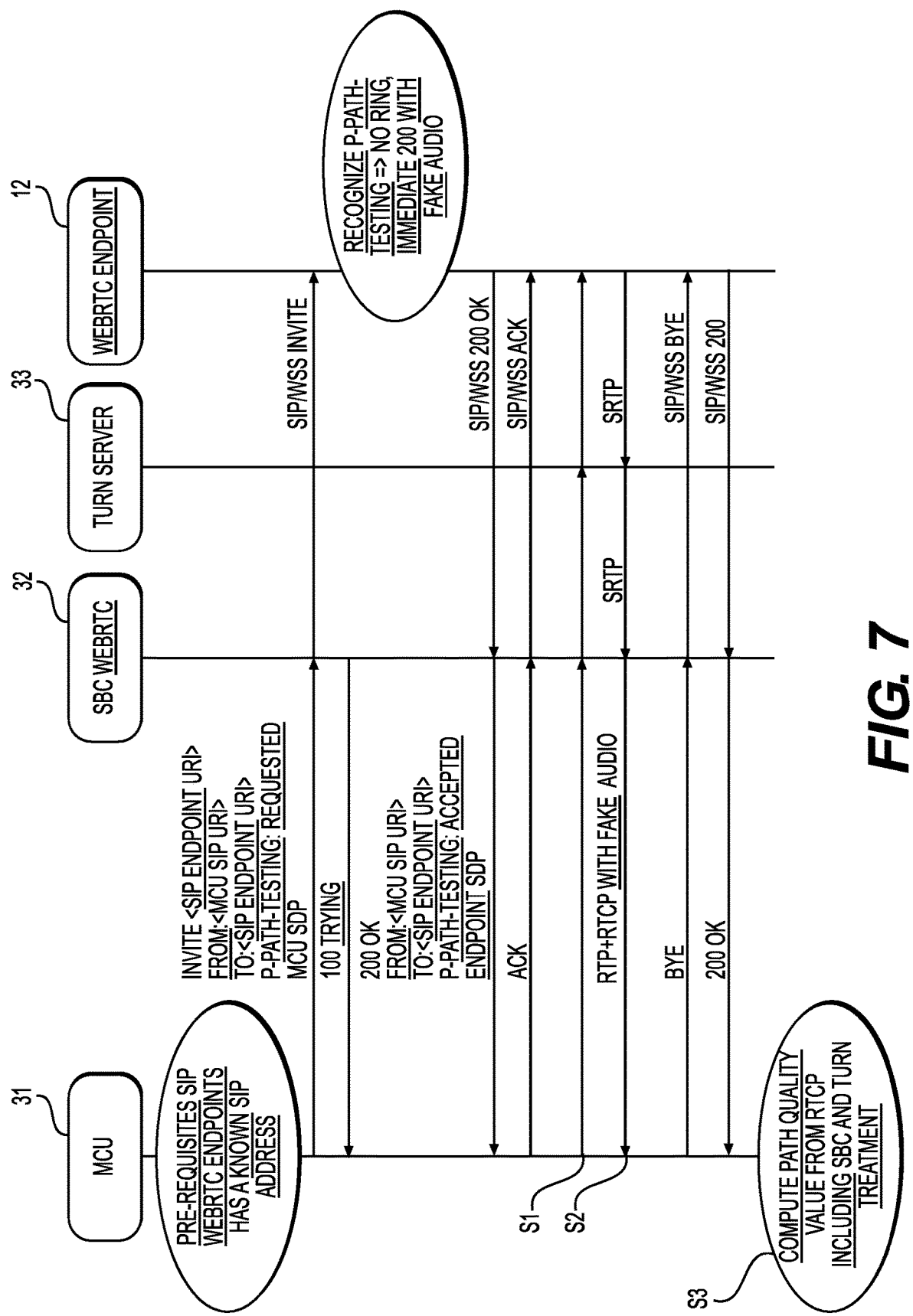
FIG. 7 is a call flow illustrating the method of FIG. 2 for a terminal connected to the MCU through a TURN server.

Steps S1, S2 and S3 of FIG. 2 are now described in detail in relation to FIG. 7, in the case when a terminal is a webRTC terminal communicating with the MCU 31 through a SBC 32 and a TURN server 33. In FIG. 7, steps S1, S2 and S3 are performed for a candidate terminal 12 of the first group. Steps S1, S3 and S3 may be performed in a similar way for any other terminal of the network and in particular for the first terminal 11.

The MCU 31 sends the INVITE request to the SBC 32 in order to establish a dialog with the terminal 12. The INVITE request includes the SIP address of the terminal 12.

The SBC 32 contacts the TURN server 33 with a request requesting the TURN server to allocate some of its resources for the SBC 32 so that it may contact the terminal 12. If allocation is possible, the TURN server 33 allocates an address for the SBC 32 to use as a relay, and sends the SBC a response indicating that the allocation was successful, which contains an allocated relayed transport address located at the TURN server 33.

The TURN server 33 receives the audio sample from the MCU 31 and relays it to the terminal 12 using UDP datagrams, which contain as their Source Address the Allocated Relayed Transport Address. The terminal 12 receives the audio sample and responds with the RTCP report, again using a UDP datagram as the transport protocol, sending the UDP datagram to the relay address at the TURN server 33. The TURN server 33 receives the RTCP report from the terminal 12, checks permissions and if they are valid, sends it back to SBC 32 which relays the RTCP report to the terminal MCU 31.

This process gets around even symmetric NATs because both the MCU 31 and terminal 12 can talk to the TURN server 33, which has allocated a relay IP address for communication.

When a terminal participating in a VoIP session belongs to a group of terminals, comprising at least another available terminal, the MCU 31 may test the perceived quality of transmission of all or some of the other terminals of the group. If the MCU 31 identifies another terminal of the group offering a better perceived quality of transmission, the MCU proposes to the end user to switch the VoIP session the identified terminal. The method may be launched at the beginning of the VoIP session or on request as will be explained in relation to FIG. 10.

To that end the MCU 31 computes the MOS of some or each terminals of the group including the terminal of the group currently participating in the VoIP session.

Figure 12:
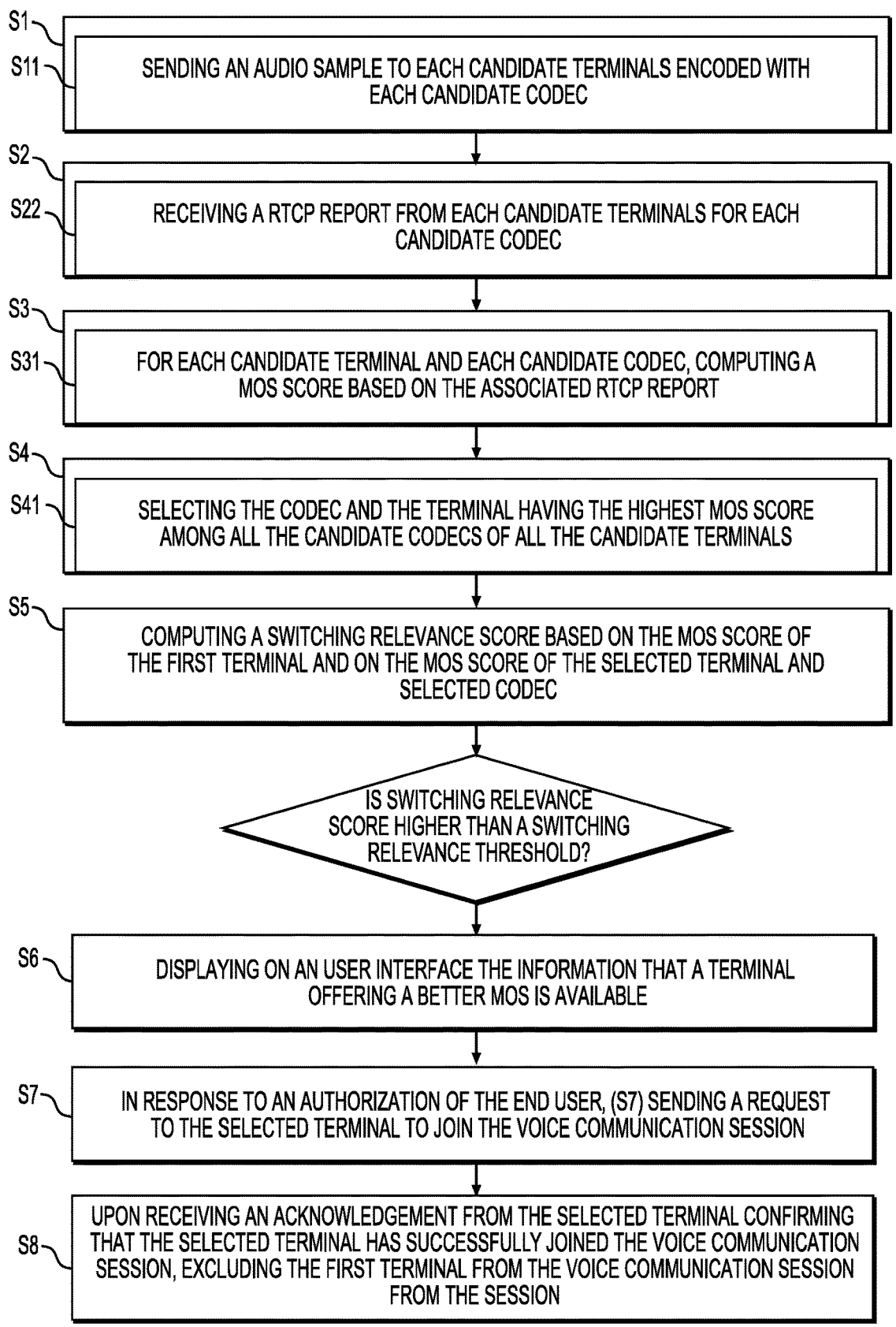
FIG. 12 is a flowchart of a method for controlling a VoIP session according to another embodiment of the technology comprising the comparison of various codecs of a terminal.

The MCU 31 may also compare the MOS of various codecs as will be described in detail in relation to FIG. 12.

Figure 3:
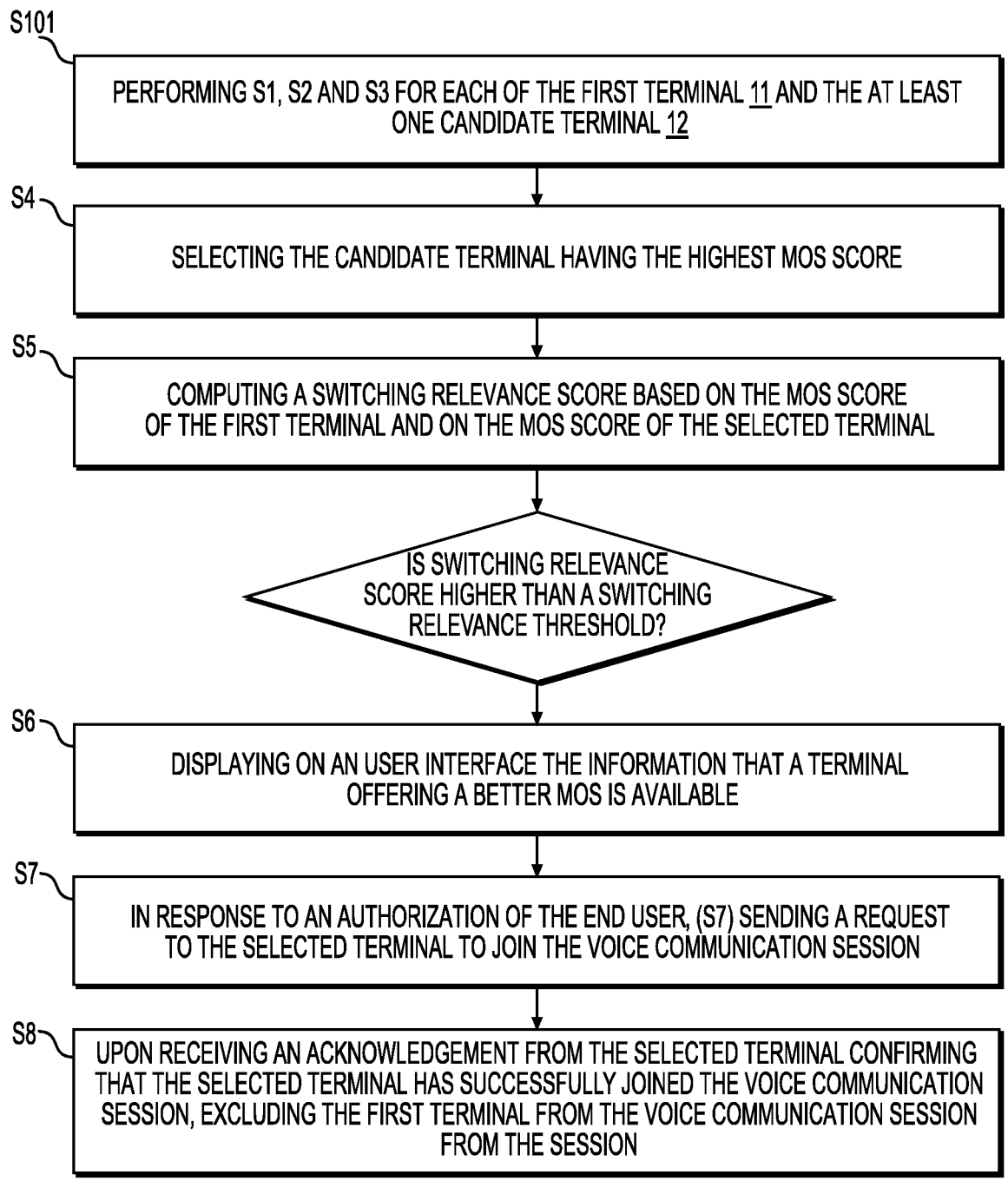
FIG. 3 is a flowchart of a method for controlling a VoIP session according to an embodiment of the technology.

FIG. 3 is a flowchart of a method for controlling a VoIP session.

The method will now be described when applied to the first group 10 of terminals of the illustrated example of FIG. 1. The method may of course be implemented similarly for the second 20 and third group 80.

At a step S101, the MCU 31 performs the steps S1, S2 and S3 of the method for testing a VoIP communication link to a terminal as described in relation to FIG. 2, for each of the first terminal 11 and the at least one candidate terminal 12.

At a step S4, the intelligent agent 35 selects the terminal having the highest MOS among all the candidate terminals 12.

The intelligent agent 35 computes, at a step S5, a switching relevance score based on the MOS of the first terminal 11 and on the MOS of the selected candidate terminal 12.

The switching relevance threshold may be a preset threshold.

Figure 8:
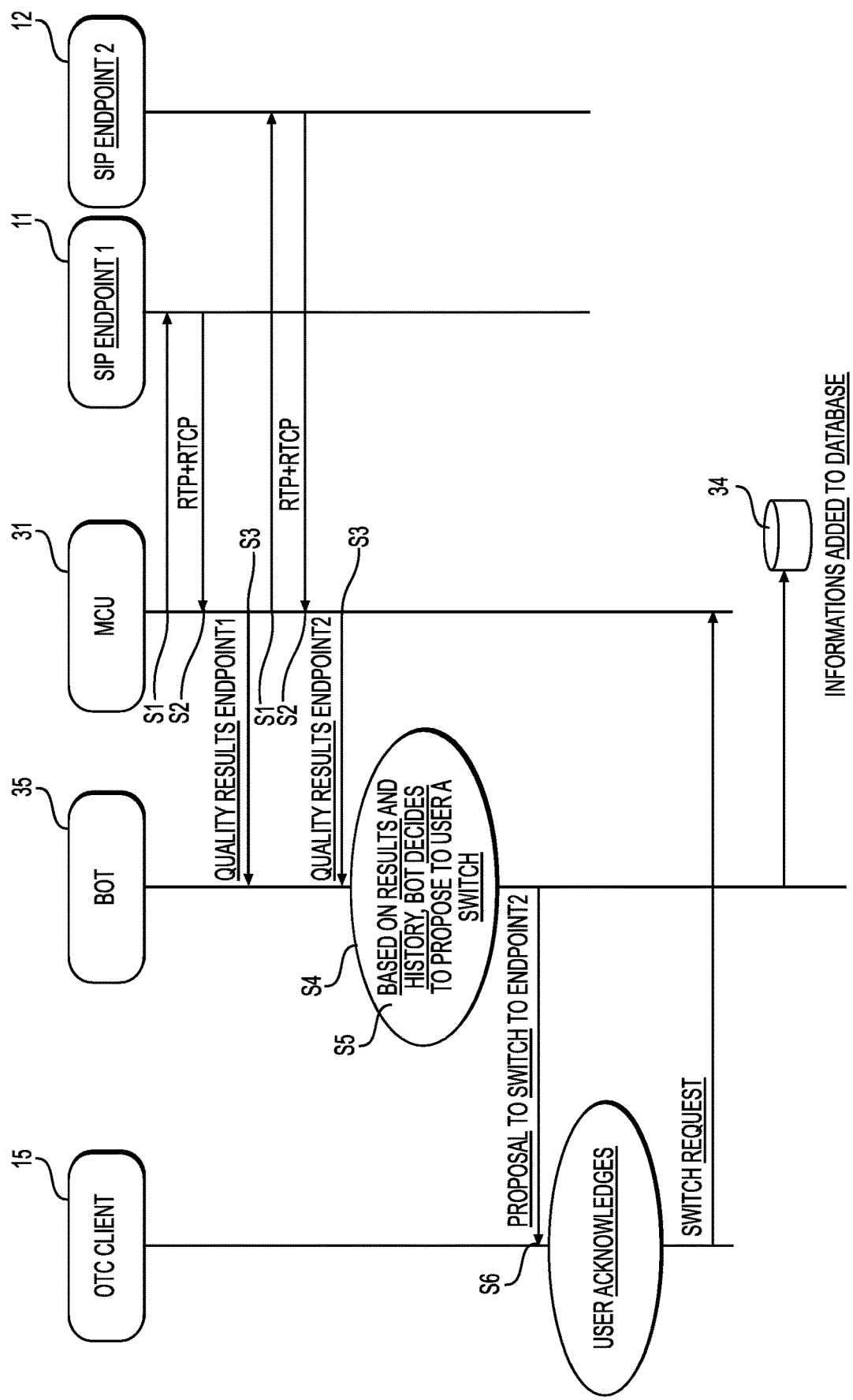
FIG. 8 is a call flow illustrating the method of FIG. 3 according to an embodiment of the technology.

Alternatively, the switching relevance threshold may be user specific and adaptive, as will be described in relation to FIG. 8.

If the switching relevance score is higher than a switching relevance threshold, the intelligent agent 35 displays, at a step S6, on the user interface 15 of the first group a request for an authorization from the end user to switch to the selected candidate terminal 12. Upon receiving an authorization from the end user to switch to the selected candidate terminal 12, the intelligent agent 35 sends a switch request to the MCU 31.

At a step S7, upon receiving a switch request, the MCU 31 sends a request to the selected candidate terminal 12 to join the VoIP session. Upon receiving an acknowledgement from the selected candidate terminal 12 confirming that the selected candidate terminal 12 has successfully joined the VoIP session, the MCU 31 excludes, at a step S8, the first terminal 11 from the VoIP session.

Compatible methods for switching a VoIP session from one terminal to another are well known and will therefore not be discussed here. For example, Alcatel-Lucent Enterprise OpenTouch solution allows switching while in communication from a desk phone to a softphone or tablet or mobile VOIP application. Other examples of methods for switching a VoIP session from one terminal to another are described in patent application US2013212287.

Figure 5:
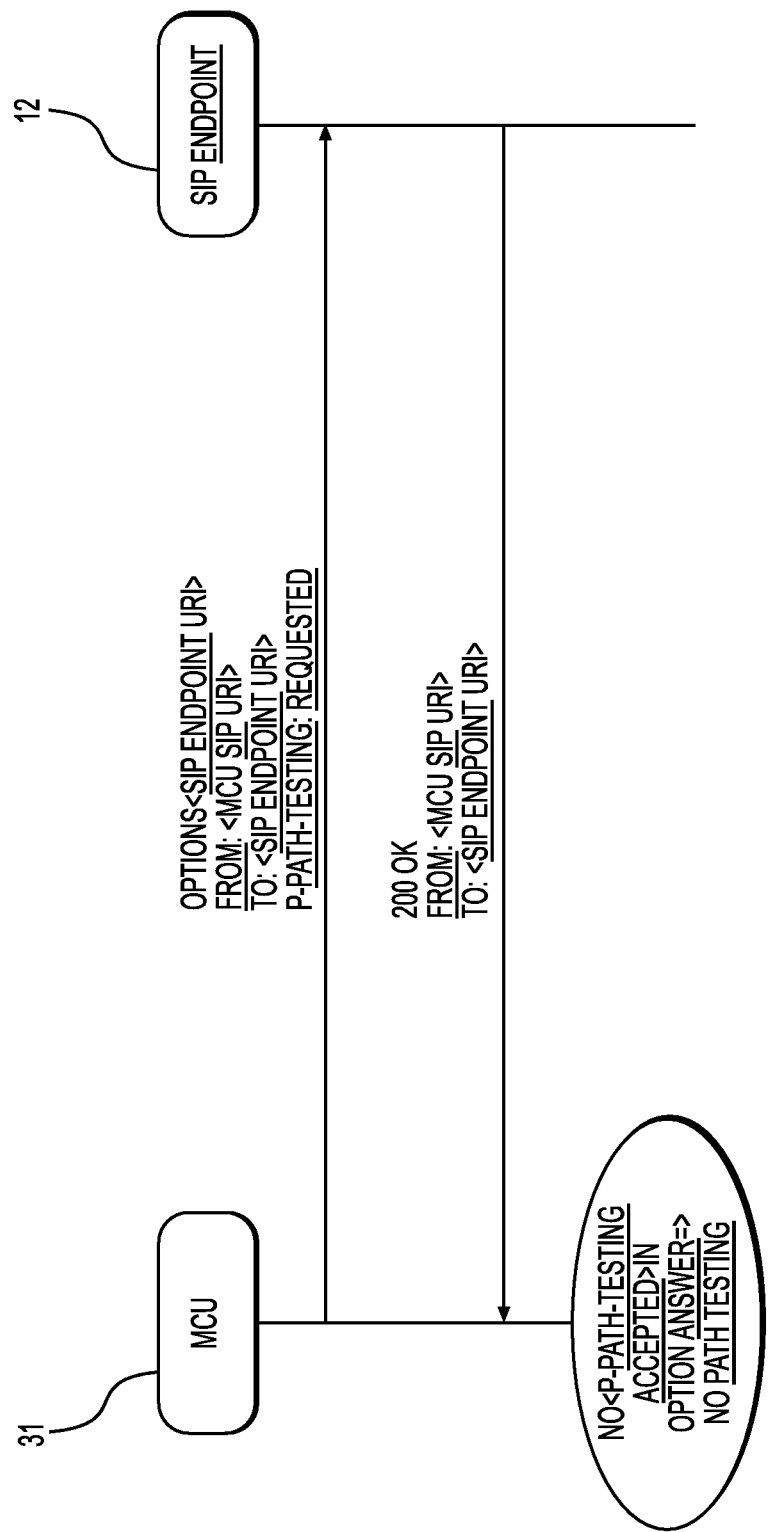
FIG. 5 is a call flow illustrating how the MCU may check whether the terminal supports the method of FIG. 2

FIG. 5 illustrates the case when a terminal has never been tested by the MCU 31. In FIG. 5, the method is performed for a candidate terminal 12 of the first group. The method may be performed in a similar way for any other terminal of the network and in particular for the first terminal 11.

The MCU 31 first checks whether the terminal 12 supports the HTTP method corresponding to method for testing a link to a terminal. To that end, the MCU 31 sends an OPTIONS message to the candidate terminal 12, requesting the terminal 12 to indicate the HTTP methods that it supports. The terminal 12 returns the identifiers of the HTTP methods it supports. If the identifier of the path testing HTTP method (p-path-testing) corresponding to the method for testing a link to a terminal is not provided in the response of the candidate terminal 12, then the MCU 31 associates a predefined value of MOS to said terminal 11 or 12.

It will now be described in detail, in relation to FIG. 8, how a user specific and adaptive switching relevance threshold may be computed. The intelligent agent 35 comprises an end user decision history database 34. Each time the intelligent agent 35 displays a request for an authorization from the end user to switch to the selected candidate terminal, the intelligent agent 35 stores in the end user decision history database 34 the timestamp, the identifier and the MOS of the first terminal 11, the identifier and MOS of the selected candidate terminal 12, and the decision of the end user, namely whether or not he gave an authorization to switch to the selected candidate terminal.

When computing a switching relevance score at step S5, the intelligent agent 35 may use the previous decisions of the end user stored in the decision history database 34.

Indeed, some end users will never switch to the selected candidate terminal even if the intelligent agent 35 notifies them that a terminal having a better MOS is available. Others will always switch the communication to the GSM phone.

The location of the first terminal 11 may also be considered. Indeed, the availability of terminals depends on the location of the end user. For example, an end user working from home can use a PSTN phone while there is no need to propose this terminal to an end user having access to the LAN. A end user working from home with systematic poor WIFI connection at home, will be proposed to use a PSTN phone, a GSM or another codec (with fewer bandwidth consumption). The MOS of a terminal may be weighted depending on the location of the terminal currently participating in the VoIP session.

Figure 9:
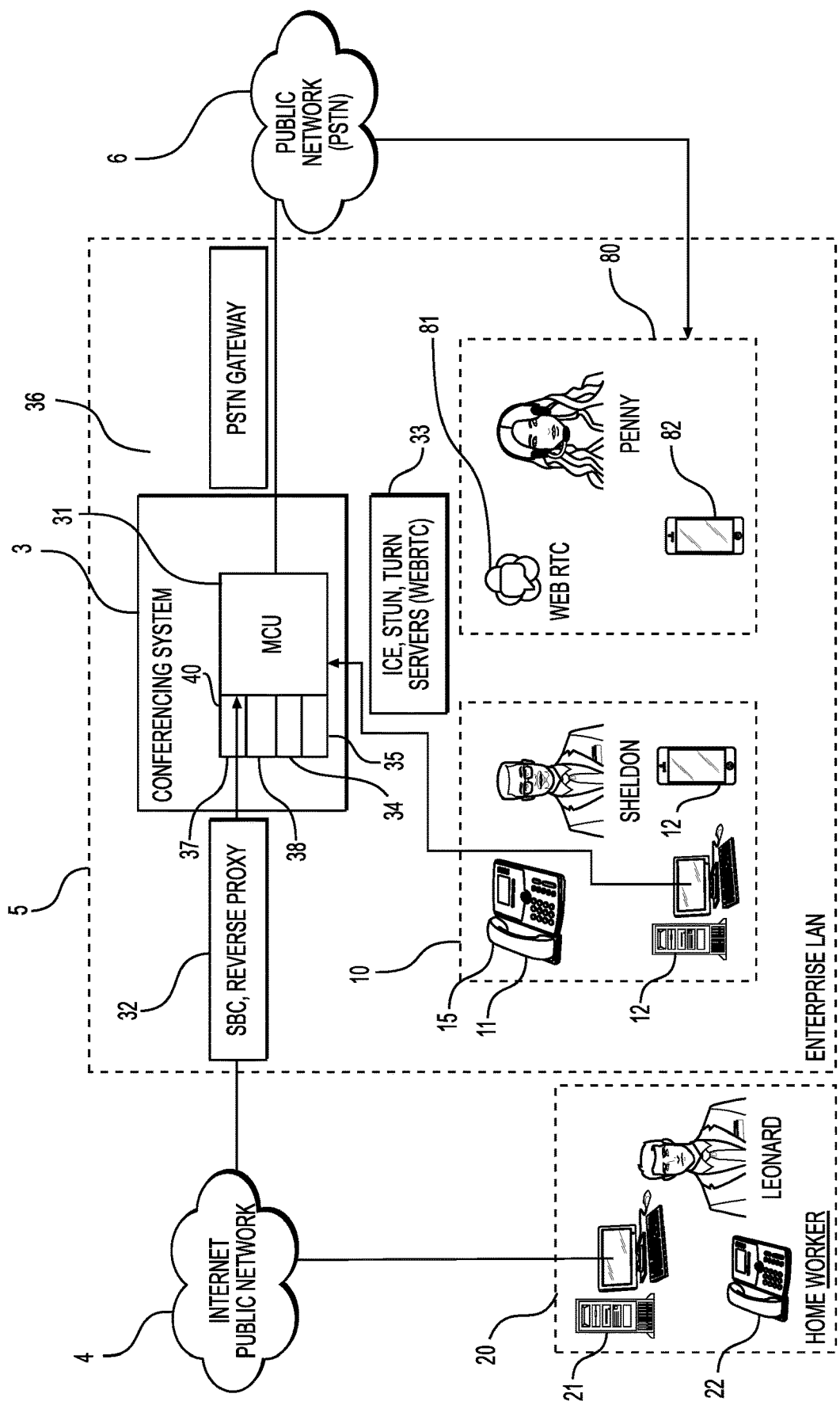
FIG. 9 illustrates the VoIP session of FIG. 1 after the method of FIG. 3 has been performed.

FIG. 9 illustrates the VoIP session of FIG. 1 after the method according to the technology has been performed for the first 10, second 20 and third 30 group of terminals. End user Leonard is still using his softphone 21. End user Sheldon is now using a SIP phone 12. End user Penny is now using a mobile phone 82.

Figure 10:
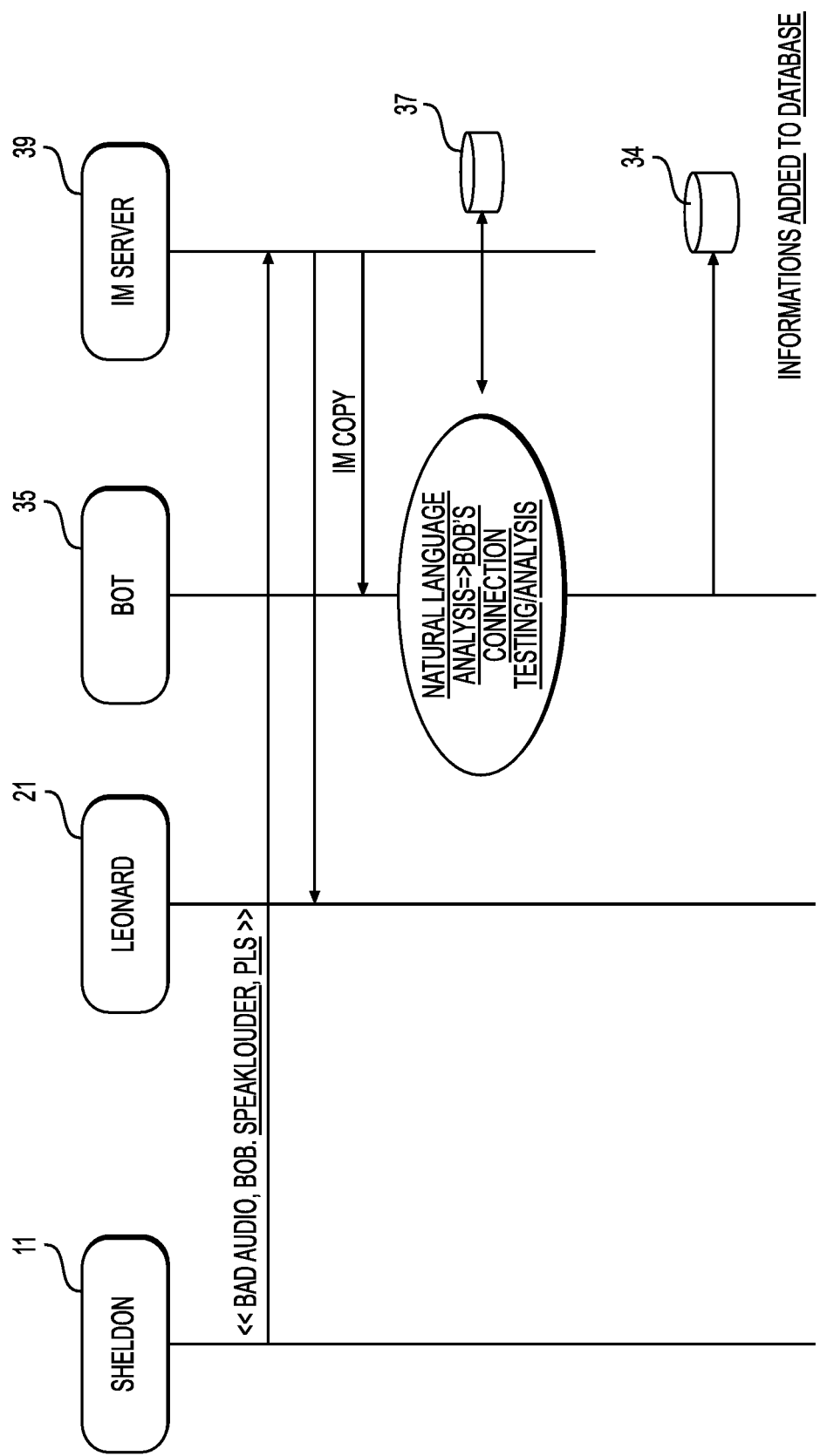
FIG. 10 is a call flow illustrating how the intelligent agent may analyze the instant messages exchanged during the VoIP session.

It will now be described in relation to FIG. 10 how the method of FIG. 3 or 12 may be launched on request.

During a VoIP session, the MCU 31 may receive an instruction form an end user to check for a terminal having the best MOS.

The intelligent agent 35 may also embed a Natural Processing Language (NPL) engine. The NPL engine comprises a NPL database 37 storing a list of words or expressions considered as indicative of a poor perceived quality of communication like "no audio", "audio KO", "we don't hear you", "I hear nothing. The NPL engine may analyze the voice transmission exchanged during the VoIP session to detect one of the words or expressions stored in the NPL database 37. Upon detection of a message corresponding to a word or expression stored in the NPL database 37 the NPL engine sends a request to the MCU 31 to check for a terminal having the best MOS for the end user who sent the message. The NPL engine has to be able to differentiate 'I don't hear you' from 'I don't hear anybody' because the actions to be put in place are different. This feature may be performed by a web service.

The NPL engine may also analyze instant messages exchanged during the VoIP session to detect one of the words or expressions stored in the NPL database 37. The instant message server 39 copies instant messages exchanged between the first terminal 11 and the second 21 or third 81 terminal, and sends a copy to the intelligent agent 35.

The intelligent agent 35 may store a copy of the audio message or instant message in the end user decision history database 34 together with a timestamp, the identifier and the MOS of the first terminal 11, the identifier and MOS of the selected candidate terminal, and the decision of the end user.

The NPL engine may be assisted by the IT manager as will be explained in relation to FIG. 11.

The comparison of various codecs will now be described in details in reference to FIG. 12. Depending on bandwidth, some codecs may have better performances than others. Moreover, depending on the user location some codecs may be more relevant than others. For example some codecs are more relevant in case of bad WIFI coverage.

At a step S11, the MCU sends to each candidate terminal various audio sample each encoded with a different codec supported by the terminal, called candidate codec.

Upon receiving an audio sample encoded with a candidate codec, the terminal sends back a reception report including statistics on the reception of the audio sample encoded with said candidate codec. At a step S21, the MCU 31 receives a reception report for each candidate codec of each candidate terminal.

At a step S31 the MCU 31 computes a MOS for each candidate codec of each candidate terminal, based on the reception report associated to said candidate codec and said candidate terminal 12.

At a step S41, the MCU 31 selects the codec and terminal having the highest MOS among all the candidate codecs and all the candidate terminals 12.

The switching relevance score is based on the MOS of the first terminal 11 and on the MOS of the selected candidate terminal 12 and of the selected codec.

For example the switching relevance score may be the difference between the MOS of the selected codec of the selected candidate terminal and the MOS of the first terminal 11.

Figure 11:
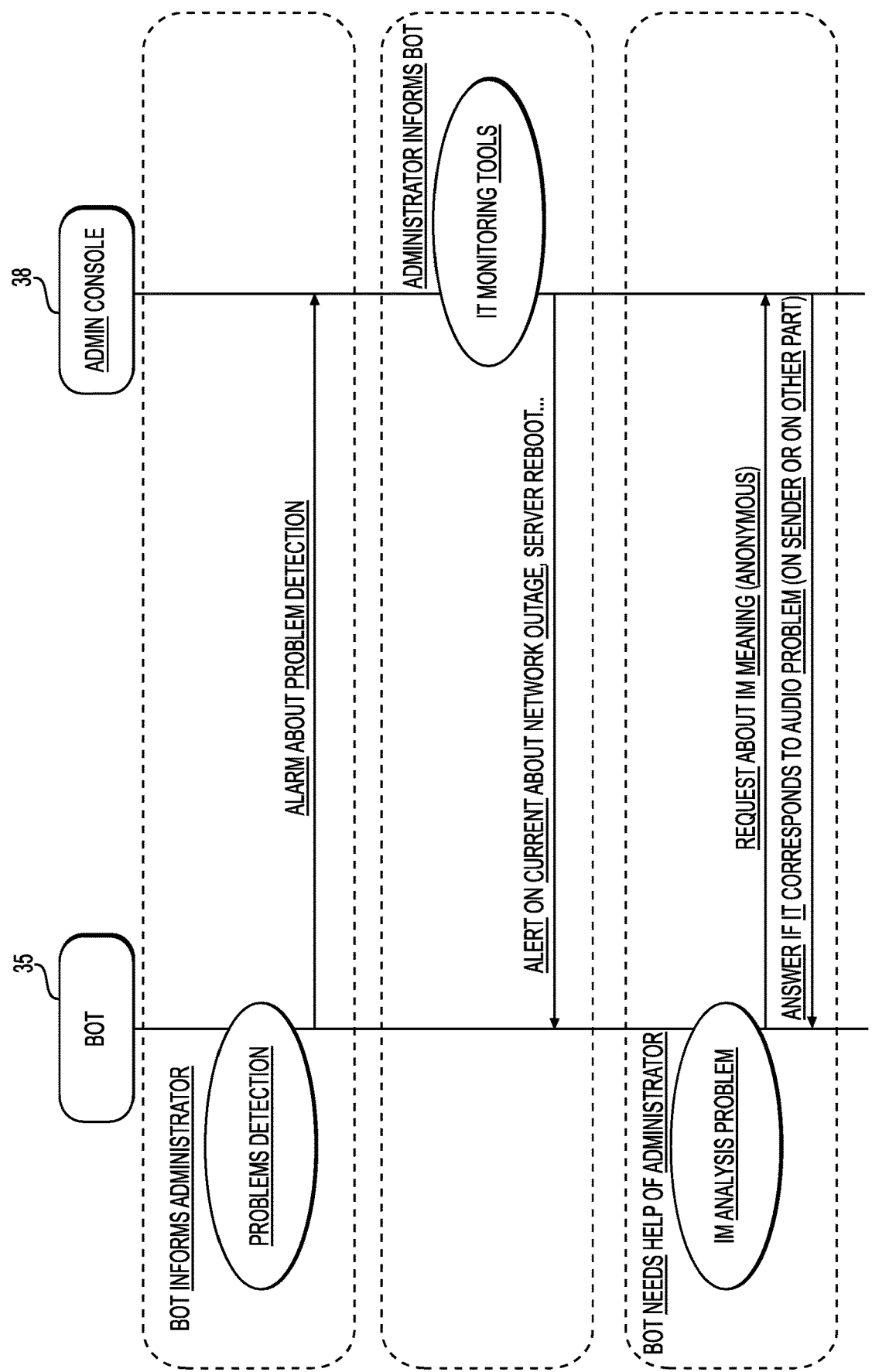
FIG. 11 is a call flow illustrating how the intelligent agent may send an alarm to the system console.

As illustrated by FIG. 11, if the MOS of all the terminals of a group are below a problem detection threshold the intelligence agent 35 may send an alarm message to the system console 38. The alarm message may comprise the MOS calculated for all the devices of the group.

Furthermore, when the NPL engine detects a word or expression potentially indicative of a poor perceived quality of communication, the intelligence agent 35 may send a request to the system console 38 to ask the IT manager if the word or expression detected is indicative of a poor perceived quality of communication. If the IT manager gives a positive response through the system console 38, the NPL engine stores the word or expression in the database.

Figure 13:
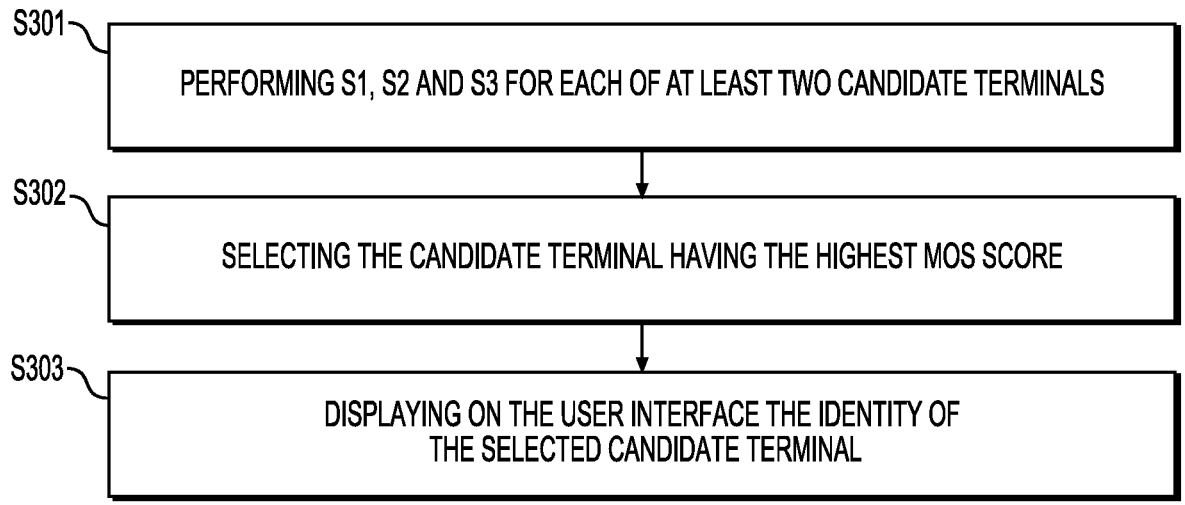
FIG. 13 is a flowchart of a method for selecting a terminal among a group of candidate terminals configured to connect to a VoIP session according to another embodiment of the technology.

The method for testing a VoIP communication link to a terminal may also be used for indicating to an end user not currently participating in a VoIP session which one of the terminals available to him offers the best perceived quality of transmission, as will now be described in relation to FIG. 13.

At a step S301, the MCU 31 performs the method for testing a VoIP communication link as described above in relation to FIG. 2, for some or each of the candidate terminals 12, and then selects at a step S302 the candidate terminal 12 for which the reception report has the highest MOS, and displays at a step S303 on the user interface 15 the identity of the selected candidate terminal 12.

The selection step S302 may be performed in a similar way as step S4 described in relation to FIG. 3. Various codecs may be compared as described in reference to FIG. 12.

Figure 14:
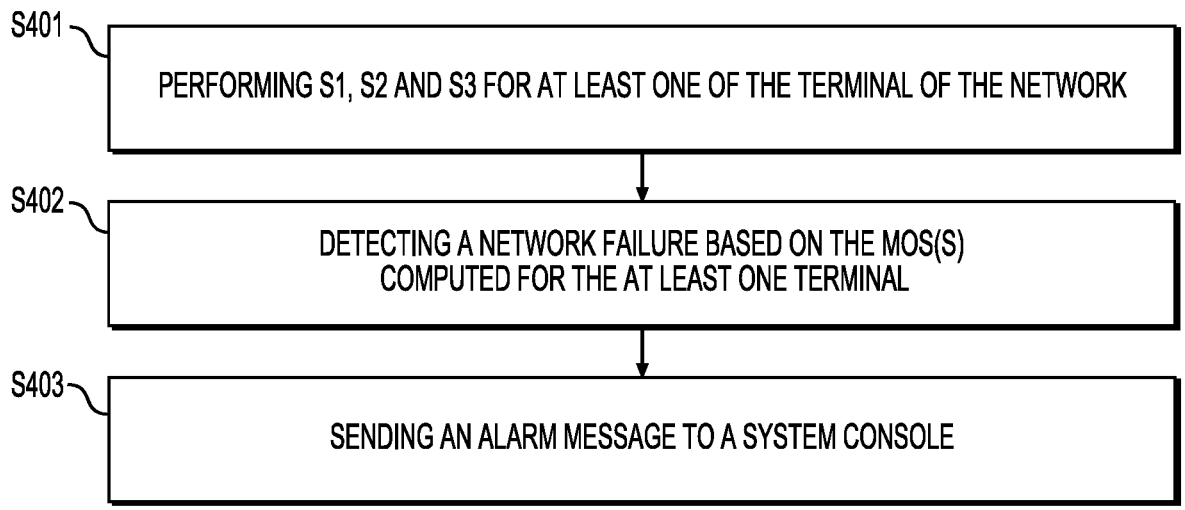
FIG. 14 is a flowchart of a method for monitoring a VoIP communication network according to another embodiment of the technology.

The method for testing a VoIP communication link to a terminal may also be used for monitoring a VoIP communication network and detecting a failure of a terminal not currently participating in a VoIP session, as will now be described in relation to FIG. 14.

At a step S401, the MCU 31 performs the method for testing a VoIP communication link as described above in relation to FIG. 2, for at least one of the terminal of the network.

At a step S402, the MCU 31 detects a network failure based on the MOS(s) computed for the at least one terminal and sends at a step S403 an alarm message to the system console 38.

The methods described hereinabove may be executed through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The technology is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. A method for selecting a terminal among a group comprising at least two candidate terminals configured to connect to a VoIP session with a multipoint control unit, and a user interface on at least one of the candidate terminals, the method being performed at the multipoint control unit comprising the steps of:
    testing the quality of a VoIP communication link between the multipoint control unit and each one of the candidate terminals by:
        sending an audio sample to each of the candidate terminals,
        receiving a reception report from each of the candidate terminals, the reception report containing reception statistics for the audio sample, and
        computing a mean opinion score (MOS) based on the reception report for each of the candidate terminals;
    selecting the candidate terminal for which the reception report has the highest MOS;
    computing a switching relevance score based on the MOS of each of the candidate terminals;
    if the switching relevance score is higher than a switching relevance threshold, displaying on the user interface a request for an authorization to switch the VoIP session to the selected candidate terminal;
    in response to a decision by the user and an authorization to switch the VoIP session to the selected candidate terminal, sending a request to the selected candidate terminal to join the VoIP session; and
    upon receiving an acknowledgement from the selected candidate terminal confirming that the selected candidate terminal has successfully joined the VoIP session, excluding the other terminals from the candidate terminals from the VoIP session.

2. The method of claim 1 further comprising the steps of:
    detecting a network failure based on the computed MOS(s); and
    sending an alarm message to a system console.

3. The method according to claim 1, wherein the step of sending an audio sample comprises, for some candidate codecs, the step of sending an audio sample encoded with the candidate codecs,
    and wherein the step of receiving a reception report comprises, for each candidate codec, the step of receiving a reception report for the audio sample encoded with the candidate codec,
    and wherein the step of computing a MOS comprises, for each candidate codec, the step of computing a MOS based on the reception report for the audio sample encoded with the candidate codec,
    and wherein the step of selecting the candidate terminal comprises the step of selecting the candidate codec and the candidate terminal having the highest MOS among all the candidate codecs and all the candidate terminals, and wherein the step of switching relevance score is further based on the selected candidate codec.

4. The method according to claim 1, wherein the switching relevance threshold is a preset threshold.

5. The method according to claim 1, further comprising storing in an end user decision history database the identifier and the MOS of the each of the selected candidate terminals and the decision of the user, the switching relevance threshold being computed furthermore based on previous decisions of the user associated to each of the candidate terminals.

6. The method according to claim 1, wherein the switching relevance threshold is computed furthermore based on the location of the candidate terminals.

7. The method according to claim 1, further comprising, if the MOS of all the candidate terminals are below a problem detection threshold, sending an alarm message to a system console.

8. The method of claim 1 wherein, when a VoIP session is established between a first terminal belonging to the group of terminals, and a second terminal, said method comprises analyzing the voice transmission between the first terminal and the second terminal to detect a word or expression stored in a natural processing language database storing a list of words or expressions considered as indicative of a poor perceived quality of transmission.

9. The method of claim 1 wherein, when a VoIP session is established between a first terminal belonging to the group of terminals, and a second terminal, said method comprises analyzing instant messages exchanged during the VoIP session to detect a word or expression stored in a NPL database storing a list of words or expressions considered as indicative of a poor perceived quality of transmission.

10. The method of claim 1 wherein the reception report includes transmitted octet and packet counts, packet loss, packet delay variation, and round-trip delay time.

11. A conferencing system configured to control a VoIP session established between a first terminal and a second terminal, the first terminal belonging to a group of terminals, the group of terminals further comprising at least one candidate terminal and a user interface, the conferencing system being configured to, for each of the first terminal and the at least one candidate terminal:
send an audio sample to the terminal,
receive a reception report from the terminal, the reception report containing reception statistics for the audio sample, and
compute a mean opinion score (MOS) for each reception report,
the conferencing system being further configured to:
select the candidate terminal for which the reception report has the highest MOS,
compute a switching relevance score based on the MOS of the first terminal and on the MOS of the selected candidate terminal,
if the switching relevance score is higher than a switching relevance threshold, display on the user interface a request for an authorization to switch the VoIP session to the selected candidate terminal,
in response to an authorization to switch the VoIP session to the selected candidate terminal, send a request to the selected candidate terminal to join the VoIP session, and
upon receiving an acknowledgement from the selected candidate terminal confirming that the selected candidate terminal has successfully joined the VoIP session, exclude the first terminal from the VoIP session.

* * * * *